US012654643B2

(12) United States Patent　　(10) Patent No.: US 12,654,643 B2
Iwai et al.　　(45) Date of Patent: Jun. 16, 2026

(54) VEHICLE DOOR STRUCTURE

(71) Applicant: Honda Motor Co., Ltd., Tokyo (JP)

(72) Inventors: Yutaka Iwai, Tokyo (JP); Takahiro Ishikawa, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 260 days.

(21) Appl. No.: 18/327,001

(22) Filed: May 31, 2023

(65) Prior Publication Data

US 2024/0051486 A1　　Feb. 15, 2024

(30) Foreign Application Priority Data

Aug. 12, 2022　　(CN) .......................... 202210964760.9

(51) Int. Cl.
　　*B60R 21/01*　　(2006.01)
　　*B60J 5/04*　　(2006.01)
　　*B60R 21/0136*　　(2006.01)
(52) U.S. Cl.
　　CPC ............. *B60R 21/0136* (2013.01); *B60J 5/04* (2013.01)
(58) Field of Classification Search
　　CPC ..... B60R 21/01; B60R 21/0136; B60R 13/02; B60R 13/0243; B60J 5/04
　　USPC .......................................................... 701/45
　　See application file for complete search history.

(56) References Cited

U.S. PATENT DOCUMENTS 6,393,767 B1 * 5/2002 Fukumoto .............. B60J 5/0402
　　　　　　　　　　　　　　　　　　　49/503
9,573,544 B1 * 2/2017 Ghannam ......... B60R 21/23138

10,690,758 B2　6/2020 Tamura et al.
11,366,033 B2 * 6/2022 Murray, Jr. ......... G01L 19/0084
11,840,127 B2 * 12/2023 Kovie .................... B60J 5/0433
2007/0084663 A1 * 4/2007 Wanami ............. B60R 21/0136
　　　　　　　　　　　　　　　　　　　180/274
2007/0089520 A1 * 4/2007 Wanami ............. B60R 21/0136
　　　　　　　　　　　　　　　　　　　73/12.09

(Continued)

FOREIGN PATENT DOCUMENTS

CN　　107415881　　12/2017
CN　　214028164　　8/2021

(Continued)

OTHER PUBLICATIONS

"Office Action of China Counterpart Application", issued on Mar. 19, 2026, with English translation thereof, p. 1-p. 19.

*Primary Examiner* — Hai H Huynh
*Assistant Examiner* — Johnny H Hoang
(74) *Attorney, Agent, or Firm* — JCIPRNET

(57) ABSTRACT

Disclosed is a vehicle door structure capable of improving the waterproof effect and detection performance of the pressure sensor, thereby improving the safety performance in collision. The vehicle door structure includes: a vehicle inner door panel provided with an opening; a vehicle outer door panel disposed on the outer side of the vehicle inner door panel in the vehicle width direction; and a pressure sensor arranged on the periphery of the vehicle inner door panel, and disposed at a position adjacent to the opening. The pressure sensor is arranged at a position overlapping the opening viewed from the vehicle width direction, and at least a part of the pressure sensor is disposed at a position closer to the inner side of the vehicle width direction than the vehicle inner door panel.

7 Claims, 7 Drawing Sheets

(56)                    References Cited

U.S. PATENT DOCUMENTS

| | | | | |
|---|---|---|---|---|
| 2009/0254238 | A1* | 10/2009 | Metzler | B60R 21/0136 |
| | | | | 701/31.4 |
| 2010/0212989 | A1* | 8/2010 | Higuchi | B60R 21/0136 |
| | | | | 180/274 |
| 2015/0084288 | A1* | 3/2015 | Arata | F16J 15/022 |
| | | | | 277/637 |
| 2017/0057443 | A1 | 3/2017 | Ghannam et al. | |
| 2018/0244232 | A1* | 8/2018 | Suzuki | B60J 5/0461 |
| 2020/0148041 | A1* | 5/2020 | Mori | B60J 5/0451 |
| 2020/0198566 | A1* | 6/2020 | Purushothaman | B60R 21/21 |
| 2021/0072106 | A1* | 3/2021 | Murray | G01L 5/0052 |
| 2021/0279982 | A1* | 9/2021 | Kendall | G07C 9/00309 |
| 2023/0041151 | A1* | 2/2023 | Fortin | B60J 5/0416 |

FOREIGN PATENT DOCUMENTS

| | | |
|---|---|---|
| JP | H05319096 | 12/1993 |
| JP | H09290705 | 11/1997 |
| JP | 2009154717 | 7/2009 |
| JP | 4966845 | 7/2012 |
| TW | 201936421 | 9/2019 |

* cited by examiner

VEHICLE DOOR STRUCTURE

CROSS-REFERENCE TO RELATED APPLICATION

This application claims the priority benefit of China application no. 202210964760.9, filed on Aug. 12, 2022. The entirety of the above-mentioned patent application is hereby incorporated by reference herein and made a part of this specification.

BACKGROUND

Technical Field

The disclosure relates to a vehicle door structure.

Description of Related Art

In recent years, active efforts have been made to provide access to sustainable transport systems that also take into account vulnerable persons such as the elderly or children among traffic participants. In order to achieve the above purpose, research and development have been conducted through development related to safety performance in collision to further improve traffic safety and convenience. However, in the development related to the improvement of the safety performance in collision, the arrangement of a pressure sensor is a problem for practitioners in the art.

For example, in current vehicle door structures (JP Laid-Open No. 4966845), a pressure sensor may be provided on the outer surface of the vehicle inner door panel in the vehicle width direction. When a collision occurs to the side surface of the vehicle door structure, as the vehicle outer door panel is deformed, the pressure of the air between the vehicle inner door panel and the vehicle outer door panel is changed. In this way, the pressure sensor is able to detect whether a collision has occurred to the side surface of the vehicle through detection of change of air pressure in the space between the vehicle inner door panel and the vehicle outer door panel, and a protection mechanism (such as opening the airbag, etc.) is launched depending on whether the detection result meets a predetermined value. However, the problem with such door structure is that water dripping from the opening for ascending/descending the glass door between the upper end of the vehicle inner door panel and the upper end of the vehicle outer door panel might be directly dripped into the pressure sensor, which affects the detection performance of the pressure sensor and reducing safety performance in collision. Under the circumstances, the pressure sensor is generally disposed in a position displaced in the front-rear direction with respect to the opening for ascending/descending the glass door, but such an approach imposes restrictions on the mounting position of the pressure sensor.

In order to solve the above problems, the present disclosure aims to improve the waterproof effect and detection performance of the pressure sensor, thereby improving the safety performance in collision. In this way, the present disclosure facilitates to contribute to the development of sustainable transportation systems.

SUMMARY

The disclosure provides a vehicle door structure, which is able to improve the waterproof effect and detection efficiency of the pressure sensor, thereby improving the safety performance in collision.

A first embodiment of the present disclosure provides a vehicle door structure, which includes: a vehicle inner door panel provided with an opening; a vehicle outer door panel disposed on the outer side of the vehicle inner door panel in the vehicle width direction; and a pressure sensor arranged on the periphery of the vehicle inner door panel, and disposed at a position adjacent to the opening. The pressure sensor is arranged at a position overlapping the opening viewed from the vehicle width direction, and at least a part of the pressure sensor is disposed at a position closer to the inner side of the vehicle width direction than the vehicle inner door panel.

A second embodiment of the present disclosure provides a vehicle door structure, which includes: a vehicle inner door panel provided with an opening; a vehicle outer door panel disposed at the outer side of the vehicle inner door panel in the vehicle width direction; and a pressure sensor disposed on the periphery of the vehicle inner door panel, and disposed at a position adjacent to the opening. The pressure sensor is disposed on a side surface of the vehicle inner door panel facing the inner side of the vehicle width direction, so as to be disposed at a position closer to the inner side of the vehicle width direction than the vehicle inner door panel.

Based on the above, in the vehicle door structure of the present disclosure, the pressure sensor is disposed at the periphery of the vehicle inner door panel, and arranged at a position adjacent to the opening. In this way, the pressure sensor is able to detect whether or not a collision has occurred to the side surface of the vehicle by detecting the pressure change of the air in the space between the vehicle inner door panel and the vehicle outer door panel as the vehicle outer door panel deforms. In the vehicle door structure of the first embodiment, the pressure sensor is disposed at a position overlapping the opening when viewed in the vehicle width direction, so that at least a part of the pressure sensor is arranged at a position closer to the inner side of the vehicle width direction than the vehicle inner door panel through the opening, thereby inhibiting the problem that water dripping from the opening for ascending/descending the glass door between the upper end of the vehicle inner door panel and the upper end of the vehicle outer door panel is directly dripped into the pressure sensor. In the vehicle door structure of the second embodiment, the pressure sensor is provided on a side surface of the vehicle inner door panel facing the inner side of the vehicle width direction, so as to be disposed at a position closer to the inner side of the vehicle width direction than the vehicle inner door panel. In this manner, it is possible to inhibit the problem that water dripping from the opening for ascending/descending the glass door is directly dripped into the pressure sensor. Accordingly, the vehicle door structure of the present disclosure may improve the waterproof effect and detection performance of the pressure sensor, thereby improving the safety performance in collision.

In order to make the above-mentioned features and advantages of the present disclosure more comprehensible, the following specific embodiments are described in detail with reference to the accompanying drawings.

DESCRIPTION OF THE EMBODIMENTS

Figure 1:
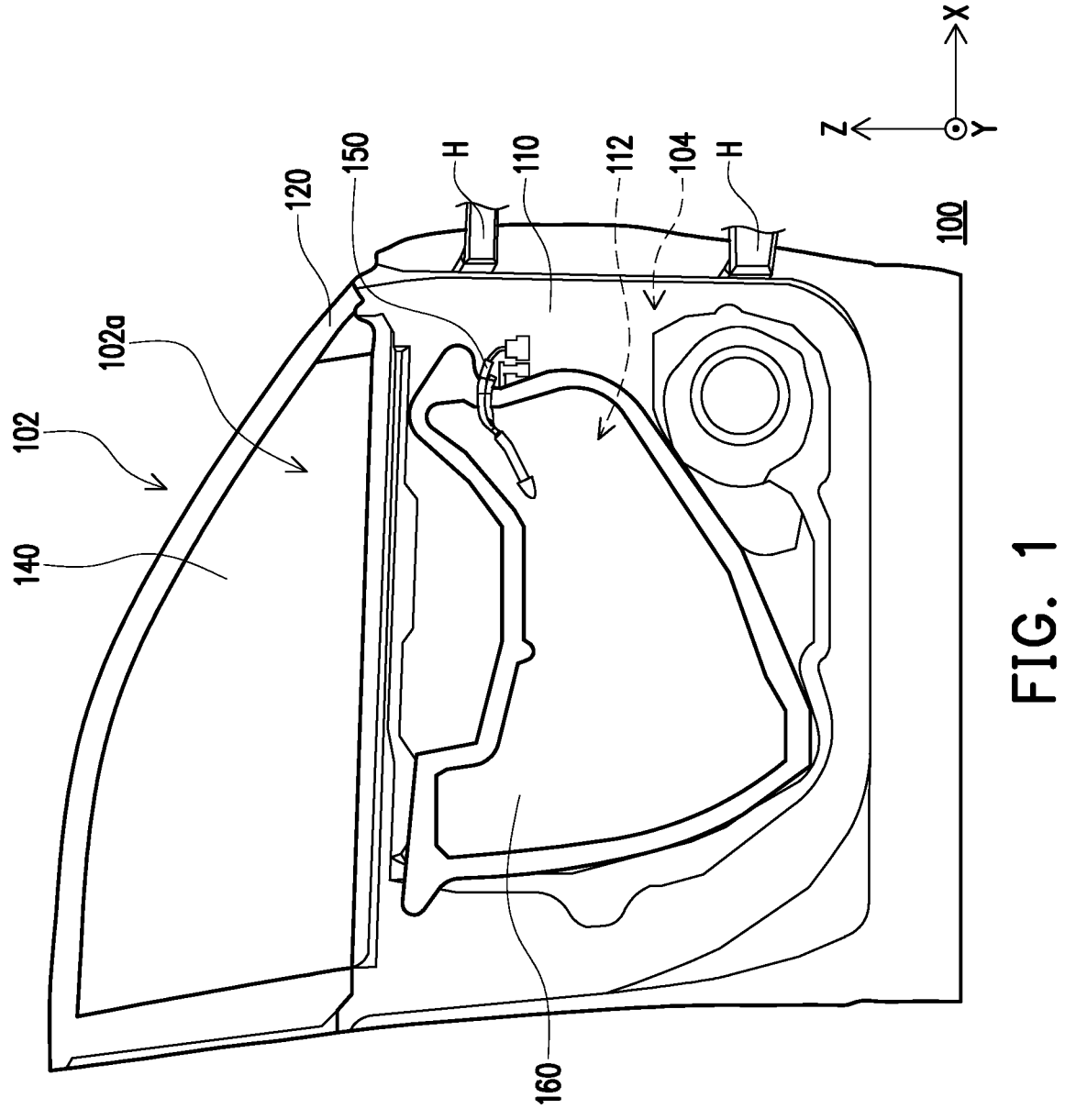
FIG. 1 is a schematic side view of a vehicle door structure of the first embodiment of the present disclosure viewed from the inner side of the vehicle width direction.
Figure 2:
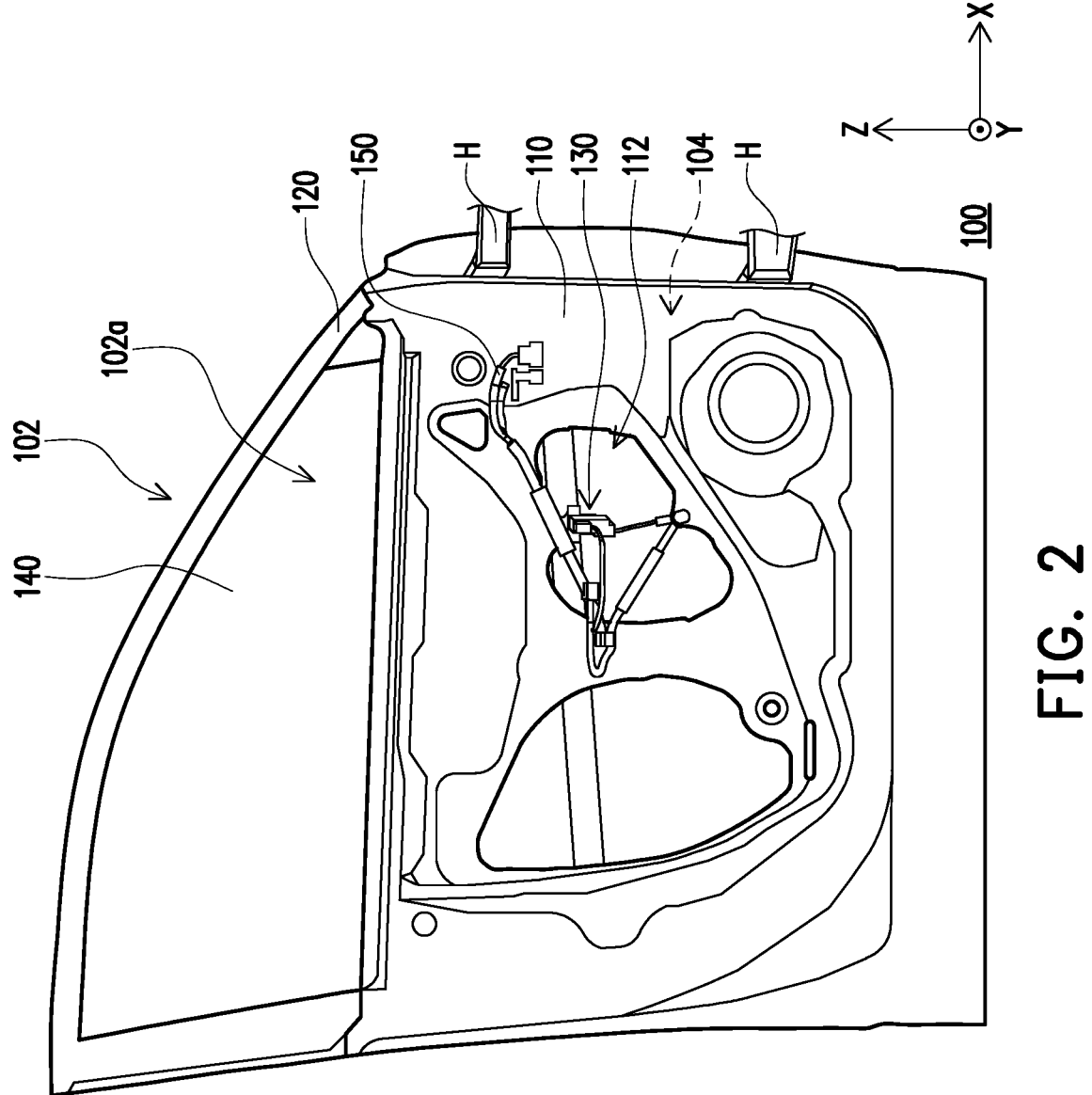
FIG. 2 is a schematic side view of the vehicle door structure shown in FIG. 1 with the sealing member removed.
Figure 3:
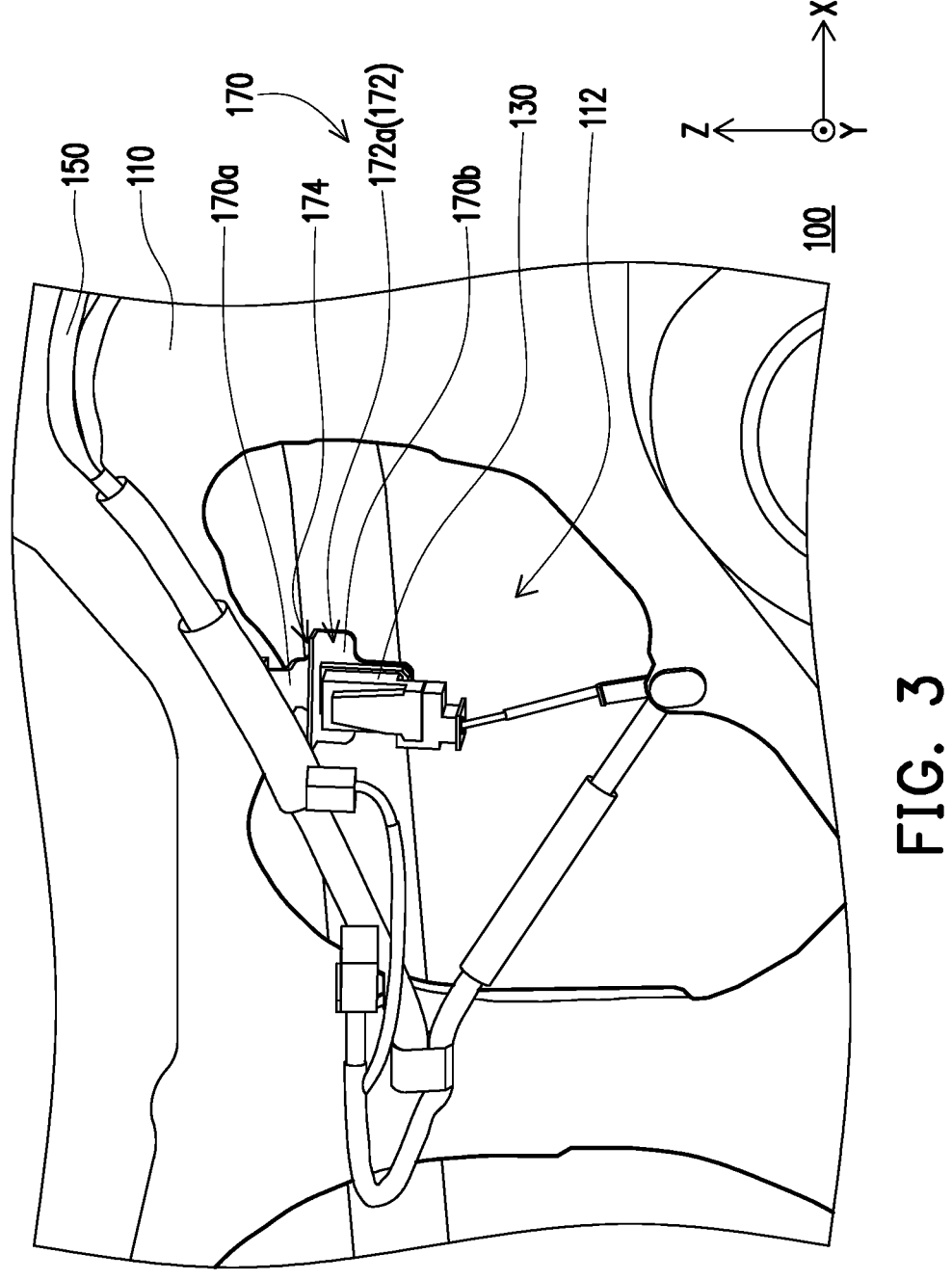
FIG. 3 is a partially enlarged view of the vehicle door structure shown in FIG. 2 at the periphery of the pressure sensor.
Figure 4:
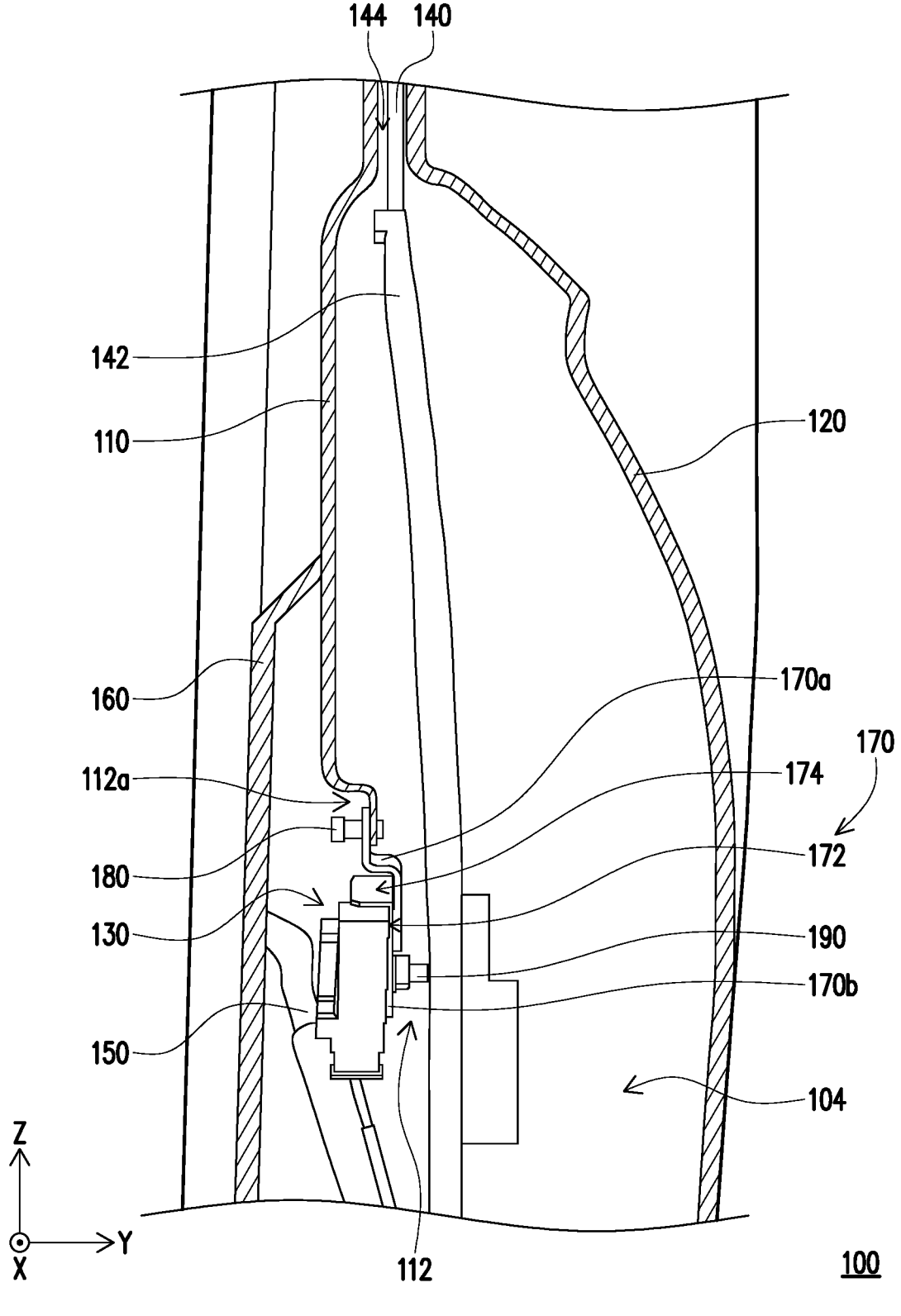
FIG. 4 is a schematic cross-sectional view of the vehicle door structure shown in FIG. 1 cut along the cross-sectional line A-A in the front-rear direction of the vehicle.
Figure 5:
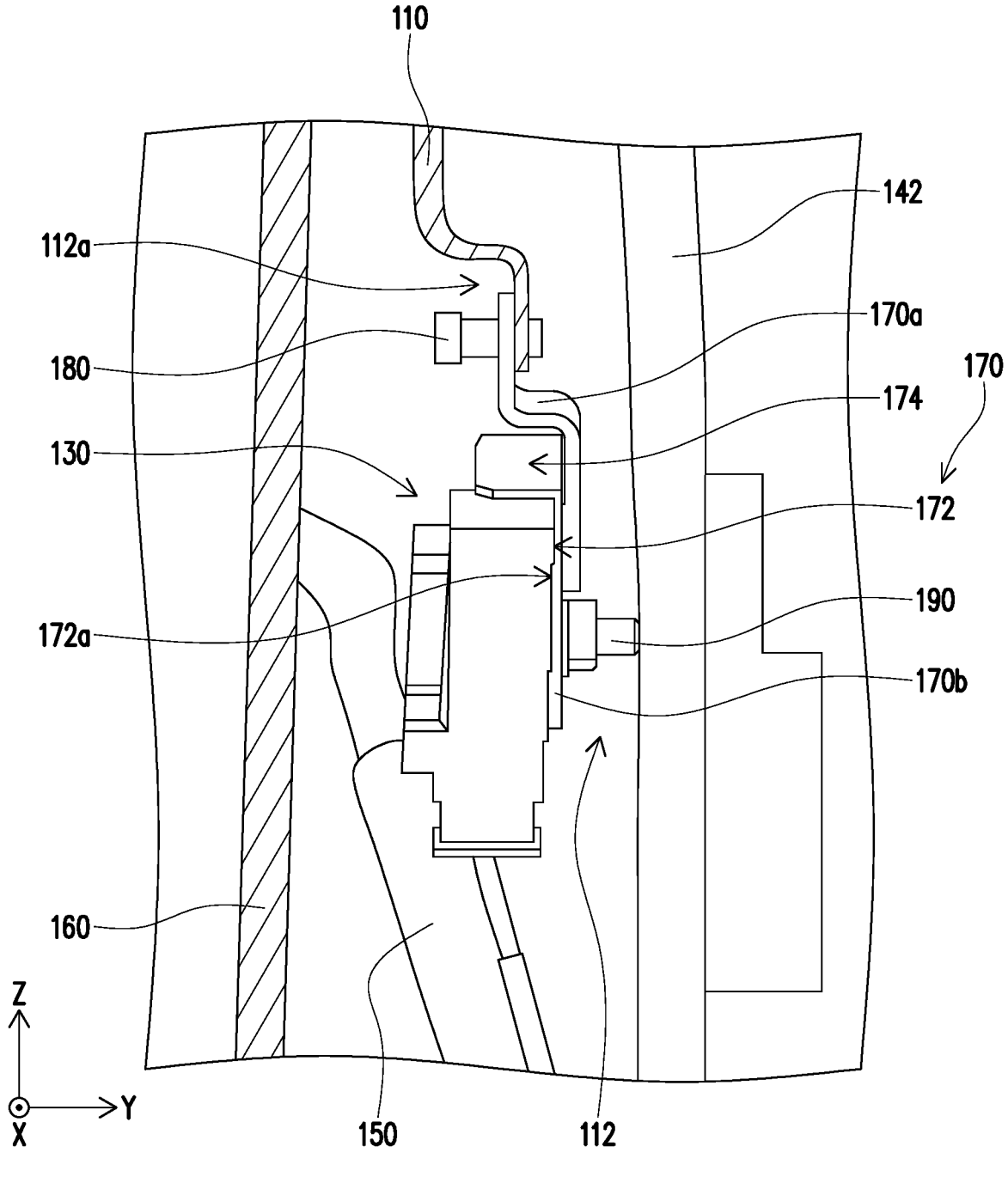
FIG. 5 is a partially enlarged view of the vehicle door structure shown in FIG. 4 at the periphery of the pressure sensor.
Figure 6:
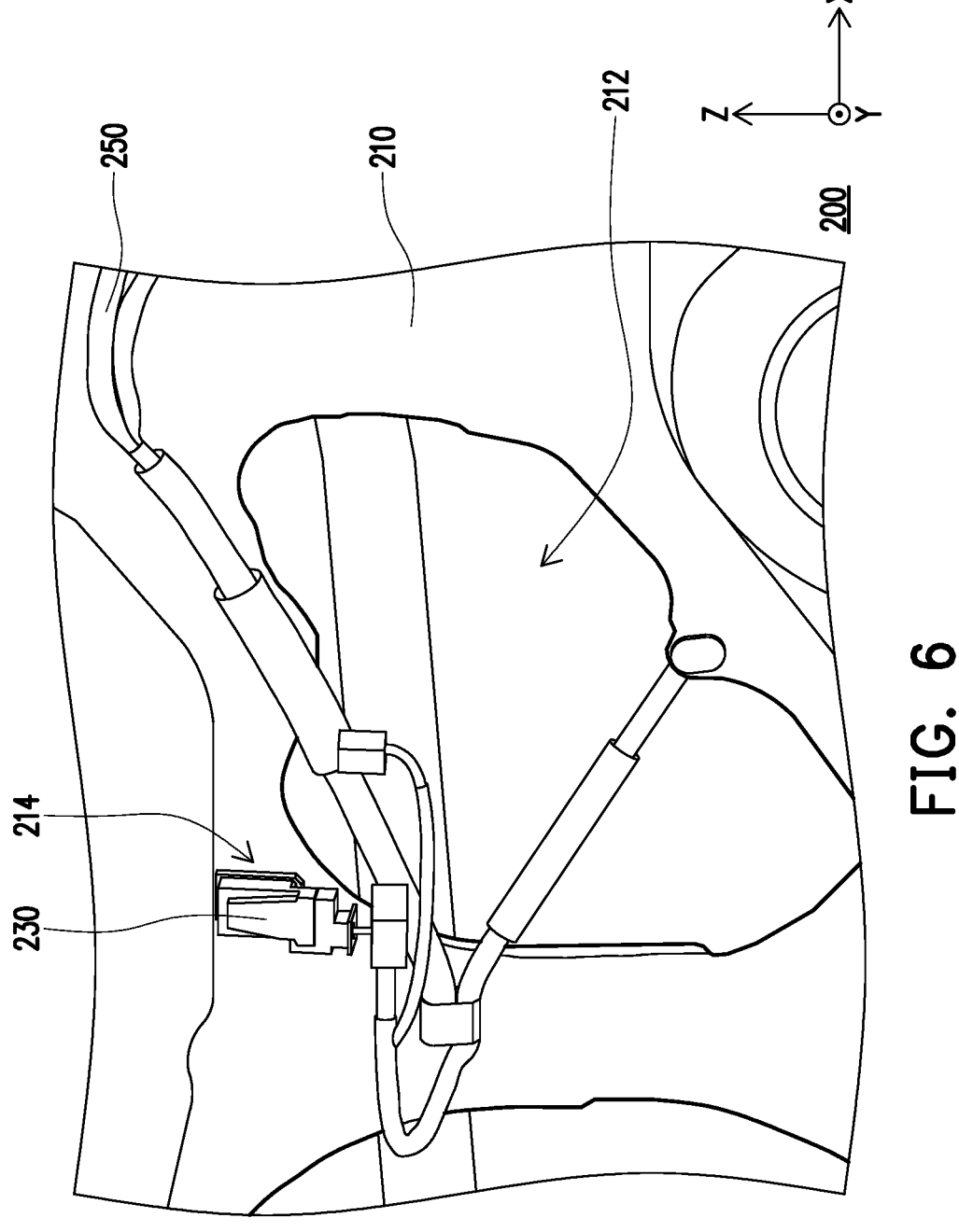
FIG. 6 is a partially enlarged view of the vehicle door structure in the second embodiment of the present disclosure at the periphery of the pressure sensor and viewed from the inner side of the vehicle width direction.
Figure 7:
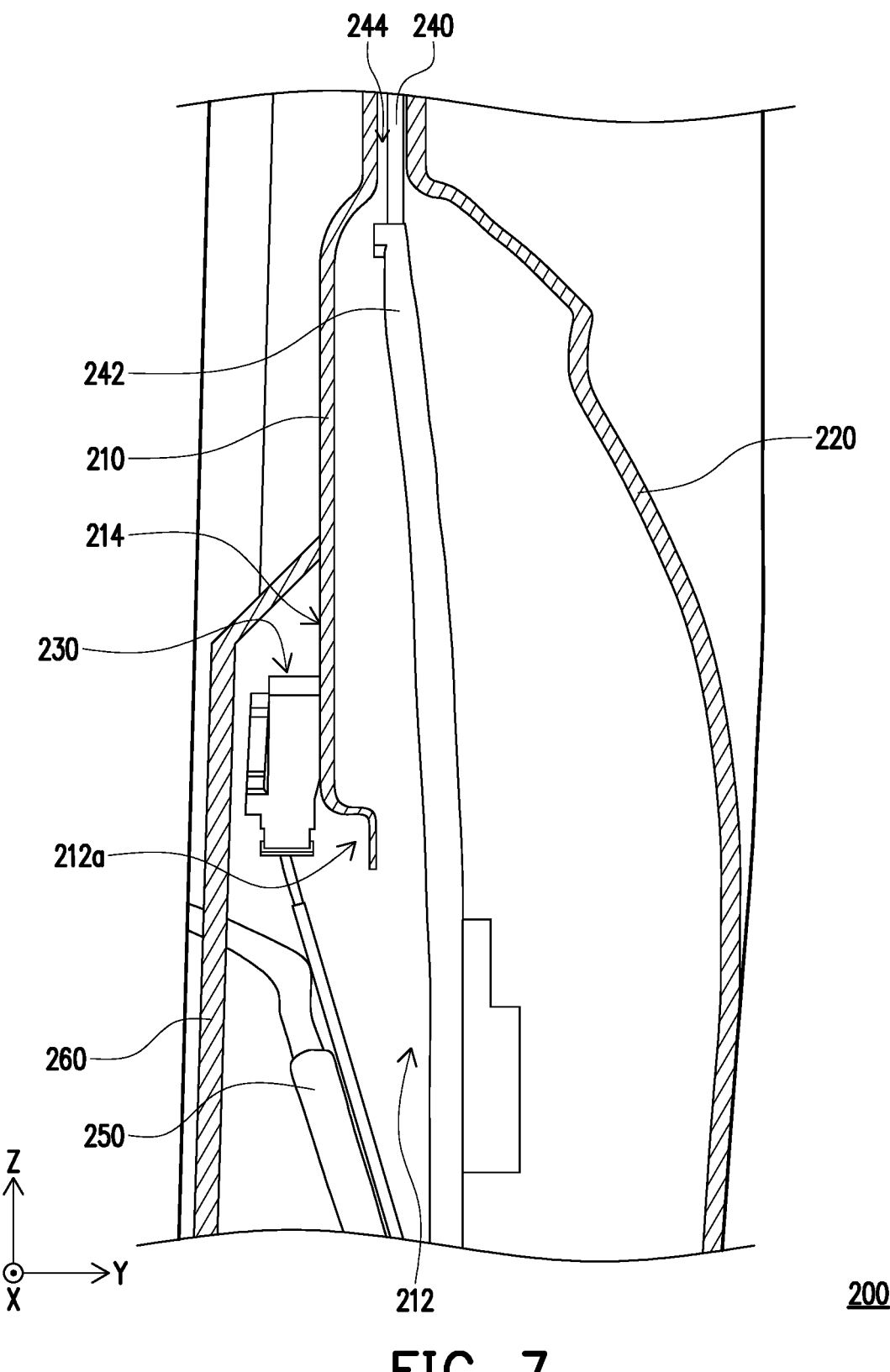
FIG. 7 is a schematic cross-sectional view of the vehicle door structure shown in FIG. 6 in the front-rear direction of the vehicle.

Reference will now be made in detail to the exemplary embodiments of the present disclosure, examples of which are illustrated in the accompanying drawings. FIG. 1 is a schematic side view of a vehicle door structure of the first embodiment of the present disclosure viewed from the inner side of the vehicle width direction. FIG. 2 is a schematic side view of the vehicle door structure shown in FIG. 1 with the sealing member removed. FIG. 3 is a partially enlarged view of the vehicle door structure shown in FIG. 2 at the periphery of the pressure sensor. FIG. 4 is a schematic cross-sectional view of the vehicle door structure shown in FIG. 1 cut along the cross-sectional line A-A in the front-rear direction of the vehicle. FIG. 5 is a partially enlarged view of the vehicle door structure shown in FIG. 4 at the periphery of the pressure sensor. Moreover, FIG. 6 is a partially enlarged view of the vehicle door structure in the second embodiment of the present disclosure at the periphery of the pressure sensor and viewed from the inner side of the vehicle width direction. FIG. 7 is a schematic cross-sectional view of the vehicle door structure shown in FIG. 6 in the front-rear direction of the vehicle. The specific structure of the vehicle door structure 100 of the first embodiment of the present disclosure will be described below with reference to FIG. 1 to FIG. 5, and the specific structure of the vehicle door structure 200 of the second embodiment of the present disclosure will be described with reference to FIG. 6 and FIG. 7, but they are some examples of the present disclosure, and the present disclosure is not limited thereto. In addition, the vehicle front-rear direction X, vehicle width direction Y, and vehicle up-down direction Z in the drawings are only used to illustrate the relative relationship of various components, and are not used to limit the actual application.

In an embodiment of the first embodiment of the present disclosure, the vehicle door structure further includes: a sealing member disposed at the inner side of the vehicle inner door panel in the vehicle width direction and covering the opening. The pressure sensor is disposed at a position closer to the outer side of the vehicle width direction than the sealing member.

In an embodiment of the first embodiment of the present disclosure, the vehicle door structure further includes: a mounting bracket disposed on the vehicle inner door panel, and the pressure sensor is mounted on the mounting bracket.

In an embodiment of the first embodiment of the present disclosure, the mounting bracket has a mounting portion and an extending portion. The mounting portion is mounted with the pressure sensor, and the extending portion extends from the upper end of the mounting portion to the top of the pressure sensor along the vehicle width direction.

In an embodiment of the first embodiment of the present disclosure, the extending portion extends to a position closer to the inner side of the vehicle width direction than the edge of the opening along the vehicle width direction.

In an embodiment of the first embodiment of the present disclosure, the pressure sensor is mounted on a mounting surface of the mounting bracket, and the mounting surface faces the inner side of the vehicle width direction.

In an embodiment of the first embodiment of the present disclosure, the mounting bracket is mounted on the vehicle inner door panel from the inner side of the vehicle width direction through a fastening member.

In an embodiment of the second embodiment of the present disclosure, the vehicle door structure further includes: a sealing member disposed at the inner side of the vehicle inner door panel in the vehicle width direction and covering the opening. The pressure sensor is arranged at a position closer to the outer side of the vehicle width direction than the sealing member.

In an embodiment of the second embodiment of the present disclosure, the pressure sensor is provided at a position that does not overlap the opening when viewed in the vehicle width direction.

Please refer to FIG. 1 to FIG. 5, in the first embodiment of the present disclosure, the vehicle door structure 100 is suitable for being disposed on the vehicle body (not shown), and one end portion thereof (as shown in FIG. 1 and FIG. 2) in the vehicle front-rear direction X may be rotatably assembled on the doorpost of the vehicle body through a rotating member H (such as a hinge, etc.), thereby opening or closing the vehicle door structure 100 with respect to rotation of the vehicle body. The vehicle door structure 100 includes a vehicle inner door panel 110, a vehicle outer door panel 120, and a pressure sensor 130. The vehicle inner door panel 110 is provided with an opening 112 (as shown in FIG. 2 and FIG. 3). The vehicle outer door panel 120 is disposed at the outer side of the vehicle inner door panel 110 in the vehicle width direction Y (as shown in FIG. 4). The pressure sensor 130 is disposed at the periphery of the vehicle inner door panel 110 and disposed adjacent to the opening 112 (as shown in FIG. 2 to FIG. 5). In this way, the pressure sensor 130 is able to detect whether or not a collision has occurred to the side surface of the vehicle by detecting the pressure change of the air in the space between the vehicle inner door panel 110 and the vehicle outer door panel 120 as the vehicle outer door panel 120 deforms.

Specifically, in this embodiment, the vehicle inner door panel 110 and the vehicle outer door panel 120 are, for example, plates with desired shapes, and are connected to each other to form the basic structure of the vehicle door structure 100. The vehicle inner door panel 110 and the vehicle outer door panel 120 are correspondingly arranged on the inner side and the outer side of the vehicle width direction Y (like the left side and the right side shown in FIG. 4 and FIG. 5), and there is a glass door 140 between the vehicle inner door panel 110 and the vehicle outer door panel 120 (shown in FIG. 1 and FIG. 4) and an elevating mechanism 142 for driving the glass door 140 to lift between vehicle inner door panel 110 and the vehicle outer door panel 120 (see the lifting guide rail extending in the vehicle up-down direction Z shown in FIG. 4 and FIG. 5, and there are also unshown components such as drive source). Furthermore, as shown in FIG. 4, an opening 144 allowing the glass door 140 to pass through and ascend/descend is disposed between the upper end of the vehicle inner door panel 110 and the upper end of the vehicle outer door panel 120. In this way, the glass door 140 is able to be moved in the vehicle up-down direction Z through the driving of the elevating mechanism 142, so as to be moved to the vehicle window area 102 (see the status shown in FIG. 1 and FIG. 2) on the upper part of the vehicle door structure 100 to close the vehicle window 102_a_ (shown in FIG. 1 and FIG. 2) provided on the vehicle door structure 100, or moved downward from the vehicle window area 102 to the lower receiving area 104 of the vehicle door structure 100 to open the vehicle window 102_a_ provided on the vehicle door structure 100. However, the present disclosure does not limit the specific structures of the vehicle inner door panel 110, the vehicle outer door panel 120, the glass door 140, the elevating mechanism 142, etc., which may be adjusted according to requirements.

Moreover, in this embodiment, the pressure sensor 130 is arranged at a position overlapping the opening 112 as viewed in the vehicle width direction Y (as shown in FIG. 2 and FIG. 3), and at least a part of the pressure sensor 130 is arranged at a position closer to the inner side of the vehicle width direction Y than the vehicle inner door panel 110 (as shown in FIG. 4 and FIG. 5). In an example, the pressure sensor 130 includes an air pressure sensor. In this way, compared with the existing technology that the pressure sensor is arranged on the outer side surface of the vehicle inner door panel, by arranging at least a part of the pressure sensor 130 at a position closer to the inner side of the vehicle width direction Y than the vehicle inner door panel 110 through the opening 112, it is possible to inhibit the problem that water dripping from the opening 144 for ascending/descending the glass door between the upper end of the vehicle inner door panel 110 and the upper end of the vehicle outer door panel 120 is directly dripped into the pressure sensor 130. In this way, the vehicle door structure 100 is able to improve the waterproof effect and detection performance of the pressure sensor 130, thereby improving the safety performance in collision.

Furthermore, in this embodiment, as shown in FIG. 1 to FIG. 3, the vehicle door structure 100 is further provided with a wire assembly 150, which extends from between the vehicle inner door panel 110 and the vehicle outer door panel 120 to the inner side of the vehicle width direction Y through the opening 112, and is configured to electrically connect the pressure sensor 130 and other components that operate via electric power to a power supply unit (not shown) in the vehicle. Moreover, as shown in FIG. 1, FIG. 4 and FIG. 5, the vehicle door structure 100 further includes a sealing member 160, and the sealing member 160 is disposed on the inner side of the vehicle inner door panel 110 in the vehicle width direction Y (as shown in FIG. 4 and FIG. 5, the sealing member 160 is on the left side of the vehicle inner door panel 110), and covers the opening 112. That is, the sealing member 160 constitutes the inner side surface of the vehicle door structure 100 on the inner side of the vehicle width direction Y (as shown in FIG. 1 and FIG. 4). Furthermore, the pressure sensor 130 is arranged at a position closer to the outer side of the vehicle width direction Y than the sealing member 160 (as shown in FIG. 4 and FIG. 5, the pressure sensor 130 is on the right side of the sealing member 160). That is, the pressure sensor 130 is arranged between the vehicle inner door panel 110 and the sealing member 160 covering the opening 112 from the inner side in the vehicle width direction Y. In this way, even if at least a part of pressure sensor 130 is disposed at a position closer to the inner side of the vehicle width direction Y than the vehicle inner door panel 110, with the opening 112 of the vehicle inner door panel 110, the pressure sensor 130 is also able to effectively detect whether or not a collision has occurred to the side surface of the vehicle by detecting the pressure change of the air in the space between the vehicle inner door panel 110 and the vehicle outer door panel 120 as the vehicle outer door panel 120 deforms. However, the present disclosure does not limit the specific structure and arrangement of the wire assembly 150 and the sealing member 160, which may be adjusted according to requirements.

In addition, in this embodiment, as shown in FIG. 3 and FIG. 5, the vehicle door structure 100 further includes a mounting bracket 170 disposed on the vehicle inner door panel 110, and the pressure sensor 130 is mounted on the mounting bracket 170. That is, the mounting bracket 170 is provided on the vehicle inner door panel 110 and is provided at the periphery of the opening 112. For example, the mounting bracket 170 is composed of an upper bracket 170_a_ and a lower bracket 170_b_ connected to each other, and the upper bracket 170_a_ is arranged on the inner surface of the vehicle inner door panel 110 in the vehicle width direction Y (as shown in FIG. 5), and the lower bracket 170_b_ extends from the upper bracket 170_a_ to the opening 112 (as shown in FIG. 3 and FIG. 5), thereby being set at a position overlapping the opening 112 as viewed in the vehicle width direction Y (as shown in FIG. 3). However, in other embodiments that are not shown, the mounting bracket 170 may also be provided as a single member. By mounting the pressure sensor 130 through the mounting bracket 170 provided on the vehicle inner door panel 110, it is possible to dispose the pressure sensor 130 at a position overlapping the opening 112 as viewed in the vehicle width direction Y (as shown in FIG. 3). In this way, the current pressure sensor is also applicable to the vehicle door structure 100 of this embodiment as the pressure sensor 130, and there is no need to change the structure of the pressure sensor 130 in order to adjust the configuration position of the pressure sensor 130.

Furthermore, in this embodiment, as shown in FIG. 3 and FIG. 5, the mounting bracket 170 has a mounting portion 172 and an extending portion 174. The mounting portion 172 and the extending portion 174 are provided, for example, by the lower bracket 170_b_, and the mounting portion 172 is provided with the pressure sensor 130, and the extending portion 174 extends from the upper end of the mounting portion 172 to the top of the pressure sensor 130 along the vehicle width direction Y. Furthermore, the pressure sensor 130 is mounted on the mounting surface 172_a_ of the mounting bracket 170, and the mounting surface 172_a_ faces the inner side of the vehicle width direction Y (for example, the mounting surface 172_a_ faces the left side as shown in FIG. 5). In this way, the pressure sensor 130 disposed on the mounting bracket 170 is able to inhibit water from directly dripping from the outer side of the vehicle width direction Y and the top of the vehicle up-down direction Z through the mounting portion 172 located on the outer side of the pressure sensor 130 and the extending portion 174 located above the pressure sensor 130. The farther the extending portion 174 extends toward the inner side of the vehicle width direction Y along the vehicle width direction Y, the better the waterproof effect will be. Preferably, the extending portion 174 extends to a position closer to the inner side of the vehicle width direction Y than the edge 112_a_ of the opening 112 along the vehicle width direction Y (as shown in FIG. 5). However, the present disclosure does not limit the specific structure of the mounting bracket 170, nor does the present disclosure limit whether the mounting bracket 170 is provided or not, that is, the arrangement method of the pressure sensor 130 is not limited, which may be adjusted according to requirements.

In addition, in this embodiment, a vehicle outer door panel 120 is disposed at the outer side of the vehicle inner door panel 110 in the vehicle width direction Y, so it is difficult for the mounting bracket 170 to be mounted on the vehicle inner door panel 110 from the outer side of the vehicle width direction Y. Therefore, preferably, the mounting bracket 170 is mounted on the vehicle inner door panel 110 from the inner side of the vehicle width direction Y through the fastening member 180 (as shown in FIG. 5). Furthermore, when the pressure sensor 130 is disposed on the mounting surface 172a of the mounting bracket 170 facing the inner side of the vehicle width direction Y, the pressure sensor 130 is generally arranged from the outer side of the vehicle width direction Y through a fastening member 190 (as shown in FIG. 5). However, similarly, the vehicle outer door panel 120 is arranged on the outer side of the pressure sensor 130 in the vehicle width direction Y. Therefore, when the mounting bracket 170 is already arranged on the vehicle inner door panel 110, it is difficult for the fastening member 180 to insert into the mounting bracket 170 from the outer side of the vehicle width direction Y to mount the pressure sensor 130 on the mounting surface 172a of the mounting bracket 170 facing the inner side of the vehicle width direction Y.

Therefore, preferably, before mounting the mounting bracket 170 on the vehicle inner door panel 110, the fastening member 190 is first inserted into the mounting bracket 170 from the outer side of the vehicle width direction Y to mount the pressure sensor 130 on the mounting surface 172a of the mounting bracket 170 facing the inner side of the vehicle width direction Y. Subsequently, the fastening member 180 is inserted into the mounting bracket 170 (such as inserting into the upper bracket 170a) on which the pressure sensor 130 has been mounted from the inner side of the vehicle width direction Y, so that the mounting bracket 170 is mounted on the vehicle inner door panel 110 in the manner that the pressure sensor 130 and the mounting surface 172a face the inner side of the vehicle width direction Y (as shown in FIG. 5). In this way, the current pressure sensor is also applicable to the vehicle door structure 100 of this embodiment as the pressure sensor 130, and there is no need to change the structure of the pressure sensor 130 in order to adjust the mounting position of the pressure sensor 130. However, the present disclosure does not limit the mounting sequence of components such as the pressure sensor 130 and the mounting bracket 170, which may be adjusted according to requirements.

Please refer to FIG. 6 and FIG. 7, in the second embodiment of the present disclosure, the vehicle door structure 200 is suitable for being disposed on the vehicle body (not shown), and may be rotatably assembled on the doorpost of the vehicle body through a rotating member (such as a hinge, etc.), thereby opening or closing the vehicle door structure 200 with respect to rotation of the vehicle body. The vehicle door structure 200 includes a vehicle inner door panel 210, a vehicle outer door panel 220, and a pressure sensor 230. The vehicle inner door panel 210 is provided with an opening 212 (as shown in FIG. 6). The vehicle outer door panel 220 is disposed at the outer side of the vehicle inner door panel 210 in the vehicle width direction Y (as shown in FIG. 7). The pressure sensor 230 is disposed at the periphery of the vehicle inner door panel 210 and disposed adjacent to the opening 212 (as shown in FIG. 6 to FIG. 7). In this way, the pressure sensor 230 is able to detect whether or not a collision has occurred to the side surface of the vehicle by detecting the pressure change of the air in the space between the vehicle inner door panel 210 and the vehicle outer door panel 220 as the vehicle outer door panel 220 deforms.

That is to say, the vehicle door structure 200 of this embodiment has a structure similar to the vehicle door structure 100 of the previous embodiment, so the description of the components such as the vehicle inner door panel 210 and the vehicle outer door panel 220 of the vehicle door structure 200 may be derived from the description of components such as the vehicle inner door panel 110 and the vehicle outer door panel 120 of the previous embodiment. Similarly, as shown in FIG. 6 and FIG. 7, the vehicle door structure 200 of this embodiment may also include a glass door 240, an elevating mechanism 242, an opening 244 for ascending/descending the glass door, a wire assembly 250, a sealing member 260 and other components, and the description thereof may be derived from the description of the glass door 140, the elevating mechanism 142, the opening 144 for ascending/descending the glass door, the wire assembly 150, the sealing member 160 and other components in the previous embodiment. The main difference between the vehicle door structure 200 of this embodiment and the vehicle door structure 100 of the previous embodiment is that the configuration of the pressure sensor 230 is different from the pressure sensor 130 of the previous embodiment.

Specifically, in this embodiment, the pressure sensor 230 is disposed on the side surface 214 of the vehicle inner door panel 210 facing the inner side of the vehicle width direction Y (as shown in FIG. 6 and FIG. 7), so as to be disposed at a position closer to the inner side of the vehicle width direction Y than the vehicle inner door panel 210 (as shown in FIG. 7). In an example, the pressure sensor 230 includes an air pressure sensor. In this way, compared with the conventional technology in which the pressure sensor is disposed on the outer surface of the vehicle inner door panel, the pressure sensor 230 may be placed closer to the inner side of the vehicle width direction Y, thus inhibiting the problem that water dripping from the opening 244 for ascending/descending the glass door is directly dripped into the pressure sensor 230. In this way, the vehicle door structure 200 is able to improve the waterproof effect and detection performance of the pressure sensor 230, thereby improving the safety performance in collision.

Furthermore, in this embodiment, as shown in FIG. 7, the vehicle door structure 200 further includes a sealing member 260, which is provided at the inner side of the vehicle inner door panel 210 in the vehicle width direction Y and covers the opening 212. Moreover, the pressure sensor 230 is arranged at a position closer to the outer side of the vehicle width direction Y than the sealing member 260 (as shown in FIG. 7, the pressure sensor 230 is on the right side of the sealing member 260). That is, the pressure sensor 230 is arranged between the vehicle inner door panel 210 and the sealing member 260 covering the opening 212 from the inner side of the vehicle width direction Y. In this way, even if the pressure sensor 230 is disposed at a position closer to the inner side of the vehicle width direction Y than the vehicle inner door panel 210, with the opening 212 of the vehicle inner door panel 110, the pressure sensor 230 is also able to effectively detect whether or not a collision has occurred to the side surface of the vehicle by detecting the pressure change of the air in the space between the vehicle inner door panel 210 and the vehicle outer door panel 220 as the vehicle outer door panel 220 deforms. However, the present disclosure does not limit the specific structure of the sealing member 260 and whether the sealing member 260 is provided or not, which may be adjusted according to requirements.

In addition, in this embodiment, as shown in FIG. 6, the pressure sensor 230 is provided at a position that does not overlap the opening 212 when viewed in the vehicle width direction Y. That is to say, the pressure sensor 230 may be directly arranged on the side surface 214 of the vehicle inner door panel 210 facing the inner side of the vehicle width direction Y, and it is not necessary to provide an additional mounting bracket 170 in order to arrange the pressure sensor 130 at a position overlapping the opening 112 when viewed from the vehicle width direction Y as shown in the previous embodiment. In this way, the existing pressure sensor is also applicable for the vehicle door structure 200 of this embodiment as a pressure sensor 230, and there is no need to change the structure of the pressure sensor 230 in order to adjust the mounting position of the pressure sensor 230. However, in other embodiments that are not shown, it is not excluded to arrange the pressure sensor 230 on the side surface 214 of the vehicle inner door panel 210 by using components such as a mounting bracket, nor is it excluded to extend a part of the pressure sensor 230 mounted on the side surface 214 of the vehicle inner door panel 210 to a position overlapping the opening 212 as viewed in the vehicle width direction Y. The present disclosure does not limit the configuration method of the pressure sensor 230, which may be adjusted according to requirements.

To sum up, in the vehicle door structure of the present disclosure, the pressure sensor is arranged at the periphery of the inner door panel of the vehicle, and is arranged at a position adjacent to the opening. Preferably, the pressure sensor includes an air pressure sensor. In this way, the pressure sensor is able to detect whether or not a collision has occurred to the side surface of the vehicle by detecting the pressure change of the air in the space between the vehicle inner door panel and the vehicle outer door panel as the vehicle outer door panel deforms. In the vehicle door structure of the first embodiment, the pressure sensor is arranged at a position overlapping the opening when viewed in the vehicle width direction, so that at least a part of the pressure sensor is arranged closer to the inner side of the vehicle width direction than the vehicle inner door panel through the opening, thereby inhibiting the problem that water dripping from the opening for ascending/descending the glass door between the upper end of the vehicle inner door panel and the upper end of the vehicle outer door panel is directly dripped into the pressure sensor. In the vehicle door structure of the second embodiment, the pressure sensor is provided on a side surface of the vehicle inner door panel facing the inner side of the vehicle width direction, so that the pressure sensor is arranged at a position closer to the inner side of the vehicle width direction than the vehicle inner door panel, and therefore it is possible to inhibit the problem that water dripping from the opening for ascending/descending the glass door is directly dripped into the pressure sensor. Accordingly, the vehicle door structure of the present disclosure may improve the waterproof effect and detection performance of the pressure sensor, thereby improving the safety performance in collision.

Finally, it should be noted that: the above embodiments are only used to illustrate the technical solutions of the present disclosure, but not to limit them; although the present disclosure has been described in detail with reference to the foregoing embodiments, those of ordinary skill in the art should understand: modifications may still be made to the technical solutions described in the foregoing embodiments, or some or all of the technical features thereof are equivalently replaced; and these modifications or replacements do not make the essence of the corresponding technical solutions depart from the scope of the technical solutions of the embodiments of the present disclosure.

What is claimed is:

1. A vehicle door structure, comprising:
   a vehicle inner door panel, provided with an opening;
   a vehicle outer door panel, disposed on an outer side of the vehicle inner door panel in a vehicle width direction;
   a sealing member, disposed at an inner side of the vehicle inner door panel in the vehicle width direction and covering the opening;
   a mounting bracket having an upper bracket disposed on an inner surface of the vehicle inner door panel in the vehicle width direction, and a lower bracket extending from the upper bracket to the opening and positioned to overlap the opening when viewed in the vehicle width direction; and
   a pressure sensor, disposed on a periphery of the vehicle inner door panel, and disposed at a position adjacent to the opening, wherein
   the pressure sensor is disposed at a position overlapping the opening viewed from the vehicle width direction, and at least a part of the pressure sensor is disposed at a position closer to an inner side of the vehicle width direction than the vehicle inner door panel and disposed on an inner surface of the lower bracket in the vehicle width direction.

2. The vehicle door structure according to claim 1, wherein the pressure sensor is disposed at a position closer to an outer side of the vehicle width direction than the sealing member.

3. The vehicle door structure according to claim 1, wherein the lower bracket has a mounting portion and an extending portion, the mounting portion is mounted with the pressure sensor, and the extending portion extends from an upper end of the mounting portion to the top of the pressure sensor along the vehicle width direction.

4. The vehicle door structure according to claim 3, wherein the extending portion extends to the position closer to the inner side of the vehicle width direction than an edge of the opening along the vehicle width direction.

5. The vehicle door structure according to claim 1, wherein the mounting bracket is mounted on the vehicle inner door panel from the inner side of the vehicle width direction through a fastening member.

6. A vehicle door structure, comprising:
   a vehicle inner door panel, provided with an opening;
   a vehicle outer door panel, disposed at an outer side of the vehicle inner door panel in a vehicle width direction;
   a sealing member, disposed at an inner side of the vehicle inner door panel in the vehicle width direction and covering the opening;
   a mounting bracket having an upper bracket disposed on an inner surface of the vehicle inner door panel in the vehicle width direction, and a lower bracket extending from the upper bracket to the opening and positioned to overlap the opening when viewed in the vehicle width direction; and
   a pressure sensor, disposed on a periphery of the vehicle inner door panel, and disposed at a position adjacent to the opening, wherein
   the pressure sensor is disposed on a side surface of the vehicle inner door panel facing an inner side of the vehicle width direction, so as to be disposed at a position closer to the inner side of the vehicle width direction than the vehicle inner door panel and disposed on an inner surface of the lower bracket in the vehicle width direction.

7. The vehicle door structure according to claim 6, wherein the pressure sensor is arranged at a position closer to an outer side of the vehicle width direction than the sealing member.

\* \* \* \* \*